US010191212B2

(12) United States Patent
Dunn (10) Patent No.: US 10,191,212 B2
(45) Date of Patent: Jan. 29, 2019

(54) EXPANDABLE LIGHT GUIDE FOR BACKLIGHT (71) Applicant: Manufacturing Resources International, Inc., Alpharetta, GA (US)

(72) Inventor: William Dunn, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 103 days.

(21) Appl. No.: 14/558,326

(22) Filed: Dec. 2, 2014

(65) Prior Publication Data
US 2015/0153506 A1 Jun. 4, 2015

Related U.S. Application Data (60) Provisional application No. 61/910,568, filed on Dec. 2, 2013.

(51) Int. Cl.
*F21V 8/00* (2006.01)
*G02F 1/1335* (2006.01)

(52) U.S. Cl.
CPC ...... *G02B 6/0091* (2013.01); *G02F 1/133615* (2013.01)

(58) Field of Classification Search
CPC .. G02B 6/0091; G02B 6/0038; G02B 6/0086; G02F 1/133608; G02F 2001/133314; G02F 2001/133322
USPC .................................................. 362/600–634
See application file for complete search history.

(56) References Cited

U.S. PATENT DOCUMENTS

| | | | |
|---|---|---|---|
| 1,812,919 A | 7/1931 | Balder | |
| 3,510,973 A | 5/1970 | Mazzocco, Sr. | |
| 4,257,084 A | 3/1981 | Reynolds | |
| 4,804,953 A | 2/1989 | Castleberry | |
| 5,040,878 A | 8/1991 | Eichenlaub | |
| 5,046,805 A | 9/1991 | Simon | |
| 5,066,106 A | 11/1991 | Sakamoto et al. | |
| 5,363,149 A | 11/1994 | Furuno et al. | |

(Continued)

FOREIGN PATENT DOCUMENTS

| | | |
|---|---|---|
| AU | 2004283319 A1 | 5/2005 |
| AU | 2007216782 A1 | 9/2007 |

(Continued)

OTHER PUBLICATIONS

Wikipedia, Gradient-index optics, 2016.
(Continued)

*Primary Examiner* — William J Carter
(74) *Attorney, Agent, or Firm* — Standley Law Group LLP (57) ABSTRACT

The exemplary embodiments herein disclose a backlight assembly having a light guide with a pair of opposing edges and a sliding LED subassembly placed along an edge of the light guide and attached to the light guide so that movement of the light guide causes movement of the sliding LED subassembly. In some embodiments, a first slot may be positioned within the light guide where a post extends from the sliding LED subassembly to engage with the first slot in the light guide. In some embodiments, a back pan may be positioned behind the light guide where a post can extend from the back pan to engage with a second slot in the light guide.

19 Claims, 10 Drawing Sheets (56) References Cited

U.S. PATENT DOCUMENTS

| | | |
|---|---|---|
| 5,440,324 A | 8/1995 | Strickling, III et al. |
| 5,453,855 A | 9/1995 | Nakamura et al. |
| 5,528,720 A | 6/1996 | Winston et al. |
| 5,598,068 A | 1/1997 | Shirai |
| 5,661,578 A | 8/1997 | Habing et al. |
| 5,856,854 A | 1/1999 | Hyun |
| 6,027,222 A | 2/2000 | Oki et al. |
| 6,166,389 A | 12/2000 | Shie et al. |
| 6,307,216 B1 | 10/2001 | Huh et al. |
| 6,400,101 B1 | 6/2002 | Biebl et al. |
| 6,419,372 B1 | 7/2002 | Shaw et al. |
| 6,421,103 B2 | 7/2002 | Yamaguchi |
| 6,481,130 B1 | 11/2002 | Wu |
| 6,601,984 B2 | 8/2003 | Yamamoto et al. |
| 6,636,003 B2 | 10/2003 | Rahm et al. |
| 6,762,815 B2 | 7/2004 | Lee |
| 6,789,921 B1 | 9/2004 | Deloy et al. |
| 6,805,468 B2 | 10/2004 | Itoh et al. |
| 6,842,204 B1 | 1/2005 | Johnson |
| 6,860,628 B2 | 3/2005 | Robertson et al. |
| 6,936,968 B2 | 8/2005 | Cross et al. |
| 6,949,772 B2 | 9/2005 | Shimizu et al. |
| 6,958,743 B2 | 10/2005 | Shin et al. |
| 7,012,379 B1 | 3/2006 | Chambers et al. |
| 7,015,650 B2 | 3/2006 | McGrath |
| 7,018,054 B2 | 3/2006 | Miyashita et al. |
| 7,025,474 B2 | 4/2006 | Campbell et al. |
| 7,038,186 B2 | 5/2006 | De Brabander et al. |
| 7,040,794 B2 | 5/2006 | Bernard |
| 7,045,828 B2 | 5/2006 | Shimizu et al. |
| 7,049,761 B2 | 5/2006 | Timmermans et al. |
| 7,053,557 B2 | 5/2006 | Cross et al. |
| 7,057,590 B2 | 6/2006 | Lim et al. |
| 7,218,812 B2 | 5/2007 | Maxwell et al. |
| 7,250,637 B2 | 7/2007 | Shimizu et al. |
| 7,259,403 B2 | 8/2007 | Shimizu et al. |
| 7,307,391 B2 | 12/2007 | Shan |
| 7,307,614 B2 | 12/2007 | Vinn |
| 7,347,706 B1 | 3/2008 | Wu et al. |
| 7,352,940 B2 | 4/2008 | Charters et al. |
| 7,375,381 B2 | 5/2008 | Shimizu et al. |
| 7,421,167 B2 | 9/2008 | Charters et al. |
| 7,473,019 B2 | 1/2009 | Laski |
| 7,481,553 B2 | 1/2009 | Kim et al. |
| 7,481,566 B2 | 1/2009 | Han |
| 7,510,299 B2 | 3/2009 | Timmermans et al. |
| 7,513,637 B2 | 4/2009 | Kelly et al. |
| 7,546,009 B2 | 6/2009 | Kukulj et al. |
| 7,738,746 B2 | 6/2010 | Charters et al. |
| 7,781,979 B2 | 8/2010 | Lys |
| 7,795,574 B2 | 9/2010 | Kennedy et al. |
| 7,813,694 B2 | 10/2010 | Fishman et al. |
| 7,982,706 B2 | 7/2011 | Ichikawa et al. |
| 8,021,900 B2 | 9/2011 | Maxwell et al. |
| 8,064,744 B2 | 11/2011 | Atkins et al. |
| 8,120,595 B2 | 2/2012 | Kukulj et al. |
| 8,194,031 B2 | 6/2012 | Yao et al. |
| 8,274,626 B2 | 9/2012 | Choi et al. |
| 8,294,168 B2 | 10/2012 | Park et al. |
| 8,351,013 B2 | 1/2013 | Dunn et al. |
| 8,400,430 B2 | 3/2013 | Dunn et al. |
| 8,529,993 B2 | 9/2013 | Charters et al. |
| 8,648,993 B2 | 2/2014 | Dunn et al. |
| 8,674,390 B2 | 3/2014 | Harris et al. |
| 8,674,963 B2 | 3/2014 | Cornish et al. |
| 8,803,790 B2 | 8/2014 | Wasinger et al. |
| 8,842,366 B2 | 9/2014 | Arnett et al. |
| 9,348,174 B2 | 5/2016 | Dunn et al. |
| 2001/0009508 A1 | 7/2001 | Umemoto et al. |
| 2001/0033726 A1 | 10/2001 | Shie et al. |
| 2002/0043012 A1 | 4/2002 | Shibata et al. |
| 2002/0126078 A1 | 9/2002 | Horibe et al. |
| 2003/0026085 A1 | 2/2003 | Ueda et al. |
| 2003/0227428 A1 | 12/2003 | Nose |
| 2004/0062029 A1 | 4/2004 | Ato |
| 2004/0113044 A1 | 6/2004 | Ishiguchi |
| 2005/0094391 A1 | 5/2005 | Campbell et al. |
| 2005/0117323 A1 | 6/2005 | King |
| 2005/0140848 A1 | 6/2005 | Yoo et al. |
| 2005/0162737 A1 | 7/2005 | Whitehead et al. |
| 2005/0265019 A1 | 12/2005 | Sommers et al. |
| 2006/0012985 A1 | 1/2006 | Archie, Jr. et al. |
| 2006/0055012 A1 | 3/2006 | Hsin Chen et al. |
| 2006/0082700 A1 | 4/2006 | Gehlsen et al. |
| 2006/0087521 A1 | 4/2006 | Chu et al. |
| 2006/0092346 A1 | 5/2006 | Moon et al. |
| 2006/0092348 A1 | 5/2006 | Park |
| 2006/0125418 A1 | 6/2006 | Bourgault |
| 2006/0197474 A1 | 9/2006 | Olsen |
| 2006/0221612 A1 | 10/2006 | Song et al. |
| 2006/0238367 A1 | 10/2006 | Tsuchiya |
| 2006/0262079 A1 | 11/2006 | Seong et al. |
| 2006/0279946 A1 | 12/2006 | Park et al. |
| 2006/0289201 A1 | 12/2006 | Kim et al. |
| 2007/0013828 A1 | 1/2007 | Cho et al. |
| 2007/0097321 A1 | 5/2007 | Whitehead et al. |
| 2007/0115686 A1 | 5/2007 | Tyberghien |
| 2007/0139574 A1 | 6/2007 | Ko et al. |
| 2007/0139929 A1 | 6/2007 | Yoo et al. |
| 2007/0147037 A1 | 6/2007 | Wang |
| 2007/0153515 A1 | 7/2007 | Hong et al. |
| 2007/0171353 A1 | 7/2007 | Hong |
| 2007/0171623 A1 | 7/2007 | Zagar et al. |
| 2007/0195535 A1 | 8/2007 | Artwohl et al. |
| 2007/0206158 A1 | 9/2007 | Kinoshita et al. |
| 2007/0230218 A1 | 10/2007 | Jachim et al. |
| 2007/0268234 A1 | 11/2007 | Wakabayashi et al. |
| 2007/0297163 A1 | 12/2007 | Kim et al. |
| 2008/0036940 A1 | 2/2008 | Song et al. |
| 2008/0043463 A1 | 2/2008 | Park et al. |
| 2008/0049164 A1 | 2/2008 | Jeon et al. |
| 2008/0068836 A1 | 3/2008 | Hatanaka et al. |
| 2008/0089064 A1 | 4/2008 | Wang |
| 2008/0101086 A1 | 5/2008 | Lee |
| 2008/0106527 A1 | 5/2008 | Cornish et al. |
| 2008/0111949 A1 | 5/2008 | Shibata et al. |
| 2008/0143916 A1 | 6/2008 | Fujino et al. |
| 2008/0151527 A1 | 6/2008 | Ueno et al. |
| 2008/0170178 A1 | 7/2008 | Kubota et al. |
| 2008/0170400 A1 | 7/2008 | Maruyama |
| 2008/0212305 A1 | 9/2008 | Kawana et al. |
| 2008/0231196 A1 | 9/2008 | Weng et al. |
| 2008/0276507 A1 | 11/2008 | Hines |
| 2008/0284942 A1 | 11/2008 | Mahama et al. |
| 2009/0002990 A1 | 1/2009 | Becker et al. |
| 2009/0009102 A1 | 1/2009 | Kahlman et al. |
| 2009/0015755 A1 | 1/2009 | Bang et al. |
| 2009/0033612 A1 | 2/2009 | Roberts et al. |
| 2009/0058795 A1 | 3/2009 | Yamazaki |
| 2009/0085859 A1 | 4/2009 | Song |
| 2009/0091634 A1 | 4/2009 | Kennedy et al. |
| 2009/0135167 A1 | 5/2009 | Sakai et al. |
| 2009/0135583 A1 | 5/2009 | Hillman et al. |
| 2009/0174840 A1 | 7/2009 | Lee et al. |
| 2009/0196069 A1 | 8/2009 | Iwasaki |
| 2009/0243501 A1 | 10/2009 | Dunn et al. |
| 2010/0102735 A1 | 4/2010 | Chang et al. |
| 2010/0109553 A1 | 5/2010 | Chang et al. |
| 2010/0165240 A1 | 7/2010 | Cho et al. |
| 2010/0194296 A1 | 8/2010 | Park |
| 2010/0220258 A1 | 9/2010 | Dunn et al. |
| 2010/0307800 A1 | 12/2010 | Wee et al. |
| 2011/0007228 A1 | 1/2011 | Yoon et al. |
| 2011/0083460 A1 | 4/2011 | Thomas et al. |
| 2011/0102704 A1 | 5/2011 | Dunn et al. |
| 2011/0116000 A1 | 5/2011 | Dunn et al. |
| 2011/0141724 A1 | 6/2011 | Erion |
| 2011/0164434 A1* | 7/2011 | Derichs ............ G02B 6/0011 362/612 |
| 2011/0205145 A1 | 8/2011 | Lin et al. |
| 2011/0242437 A1 | 10/2011 | Yoo et al. |
| 2011/0242839 A1 | 10/2011 | Dunn et al. |
| 2012/0050958 A1 | 3/2012 | Sanford et al. |
| 2012/0062819 A1 | 3/2012 | Dunn et al. |

(56) References Cited

U.S. PATENT DOCUMENTS

| | | | |
|---|---|---|---|
| 2012/0098794 A1 | 4/2012 | Kleinert et al. |
| 2012/0134139 A1 | 5/2012 | Jang et al. |
| 2012/0242926 A1 | 9/2012 | Hsu et al. |
| 2012/0250329 A1 | 10/2012 | Suehiro et al. |
| 2012/0274882 A1 | 11/2012 | Jung |
| 2012/0314447 A1 | 12/2012 | Huang |
| 2012/0327039 A1 | 12/2012 | Kukulj |
| 2013/0016296 A1 | 1/2013 | Fujita et al. |
| 2013/0027633 A1 | 1/2013 | Park et al. |
| 2013/0094160 A1 | 4/2013 | Narumi |
| 2013/0163277 A1 | 6/2013 | Kim et al. |
| 2013/0258659 A1 | 10/2013 | Erion |
| 2013/0278868 A1 | 10/2013 | Dunn et al. |
| 2014/0016355 A1* | 1/2014 | Ajichi .............. G02B 6/0091 362/632 |
| 2014/0085564 A1 | 3/2014 | Hendren et al. |
| 2014/0104538 A1 | 4/2014 | Park et al. |
| 2014/0134767 A1 | 5/2014 | Ishida et al. |
| 2014/0268657 A1 | 9/2014 | Dunn et al. |
| 2014/0361969 A1 | 12/2014 | Wasinger et al. |
| 2015/0009653 A1 | 1/2015 | Dunn et al. |
| 2015/0153506 A1 | 6/2015 | Dunn |
| 2015/0219954 A1* | 8/2015 | Kubo .............. G02F 1/133308 348/794 |
| 2015/0226996 A1* | 8/2015 | Ohashi .............. G02B 6/0011 348/725 |
| 2015/0346525 A1 | 12/2015 | Wolf et al. |
| 2016/0103275 A1 | 4/2016 | Diaz et al. |
| 2016/0238876 A1 | 8/2016 | Dunn et al. |
| 2017/0059938 A1 | 3/2017 | Brown et al. |
| 2017/0248823 A1 | 8/2017 | Dunn et al. |

FOREIGN PATENT DOCUMENTS

| | | |
|---|---|---|
| CA | 2536130 A1 | 5/2005 |
| CA | 2688214 A1 | 11/2008 |
| CN | 1836179 A | 9/2006 |
| CN | 101432647 B | 5/2007 |
| CN | 101048685 A | 10/2007 |
| CN | 101339272 A | 1/2009 |
| CN | 101351765 A | 1/2009 |
| CN | 101681222 A | 3/2010 |
| EP | 0313331 | 4/1989 |
| EP | 1678534 A1 | 7/2006 |
| EP | 1805539 A1 | 7/2007 |
| EP | 2156276 A4 | 5/2008 |
| EP | 1941342 A1 | 7/2008 |
| IN | 30/2007 | 2/2006 |
| IN | 03/2009 | 5/2008 |
| IN | 15/2010 | 12/2009 |
| JP | 11095214 A | 4/1999 |
| JP | 2002064842 | 2/2002 |
| JP | 2002209230 | 7/2002 |
| JP | 2004004581 A | 1/2004 |
| JP | 2007509372 B2 | 10/2004 |
| JP | 2005228996 A | 8/2005 |
| JP | 2005236469 | 9/2005 |
| JP | 2008518251 A | 10/2005 |
| JP | 2007080872 A | 3/2007 |
| JP | 2009535723 A5 | 5/2007 |
| JP | 2008112719 A | 5/2008 |
| JP | 2008256819 A | 10/2008 |
| JP | 2009036964 A | 2/2009 |
| JP | 2009512898 A | 3/2009 |
| JP | 2009231473 A | 10/2009 |
| JP | 2010509622 A | 3/2010 |
| JP | 2010527100 A | 8/2010 |
| JP | 2011081424 A | 4/2011 |
| KR | 1020070003755 A | 2/2006 |
| KR | 1020070084554 A | 5/2007 |
| KR | 20080013592 A | 2/2008 |
| KR | 20080063414 A | 7/2008 |
| KR | 20080074972 A | 8/2008 |
| KR | 1020090007776 A | 1/2009 |
| KR | 20100019997 A | 2/2010 |
| KR | 1020050033986 A | 4/2014 |
| TW | 200615598 A | 5/2006 |
| TW | 200802054 A | 1/2008 |
| TW | 200808925 A | 2/2008 |
| TW | 200809285 A | 2/2008 |
| TW | 200809287 A | 2/2008 |
| TW | 200828093 A | 7/2008 |
| TW | 200912200 A | 3/2009 |
| TW | 201030376 A | 8/2010 |
| TW | 201038114 A | 10/2010 |
| WO | WO9608892 | 3/1996 |
| WO | WO2005051054 A2 | 6/2005 |
| WO | WO2006001559 A1 | 1/2006 |
| WO | WO2006109237 A1 | 10/2006 |
| WO | WO2007052777 A1 | 5/2007 |
| WO | WO2005040873 A1 | 5/2008 |
| WO | WO2008138049 A | 11/2008 |
| WO | WO2009004574 A1 | 1/2009 |
| WO | WO2010080624 | 7/2010 |
| WO | WO2010129271 A2 | 11/2010 |
| WO | WO2011100429 A2 | 8/2011 |
| WO | WO2011143719 | 11/2011 |
| WO | WO2014158642 A1 | 10/2014 |
| WO | WO2015003130 A1 | 1/2015 |

OTHER PUBLICATIONS

Patrick Frantz & Deania Fernandez, Printed Circuit Boards (PCBs), Feb. 18, 2004, 2 Pages, Version 1.1.
Teravision Corp., LCD-TV Panel Control Board Specification, Nov. 2007, 24 Pages.
Supertex Inc., Constant Off-time, Buck-based LED Drivers Using HV9910, Nov. 2, 2004, 4 Pages.
Grin Tech, Grin Lenses, Aug. 25, 2016, 4 Pages.
Supertex Inc., Universal High Brightness LED Driver, 2007, 8 Pages.
Shigeru Aoyama, Akihiro Funamoto & Koichi Imanaka, Hybrid normal-reverse prism coupler for light-emitting diode backlight systems, Oct. 1, 2006, 6 Pages, vol. 45, No. 28.
Panel-Brite, Inc., High Brightness LED Backlight Technology, Mar. 11, 2009, 1 Page.
RPO, How Digital Waveguide Touch Works, Sep. 15, 2011, 1 Page.
Dave Ross, How Transmissive Film Works, article, 2008, 9 pages.
Schott, Glass made of Ideas—OPALIKA, 2016, 2 pages.

* cited by examiner

EXPANDABLE LIGHT GUIDE FOR BACKLIGHT

CROSS-REFERENCE TO RELATED APPLICATIONS

This application claims priority to U.S. Provisional Application No. 61/910,568 filed on Dec. 2, 2013, which is herein incorporated by reference in its entirety.

TECHNICAL FIELD

Embodiments generally relate to backlight assemblies for static advertising displays as well as liquid crystal displays.

BACKGROUND OF THE ART

Backlit displays are used in a number of applications including advertising, entertainment, or informational applications. They are also used in a number of different operating environments including outdoors, direct sunlight, or other applications which may have warm or cool ambient temperatures surrounding the display. Most backlights utilize some form of light guide, which is commonly made of materials which may be affected by changes in temperature. Thermal expansion or contraction of the light guide can cause both mechanical and optical defects in the display.

SUMMARY OF THE EXEMPLARY EMBODIMENTS

Exemplary embodiments provide a backlight assembly where the light guide is permitted to expand and contract without substantially changing the distance between the LEDs and the light guide. A first set of slots may be placed in the light guide and a second set of slots are preferably positioned on the opposite side of the light guide and parallel to the first set of slots. The first set of slots may engage with a post which extends from the back pan. The second set of slots may contain a post which extends from a sliding LED subassembly. The sliding LED subassembly is preferably connected with the light guide so that the LEDs within the subassembly can move with the light guide.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
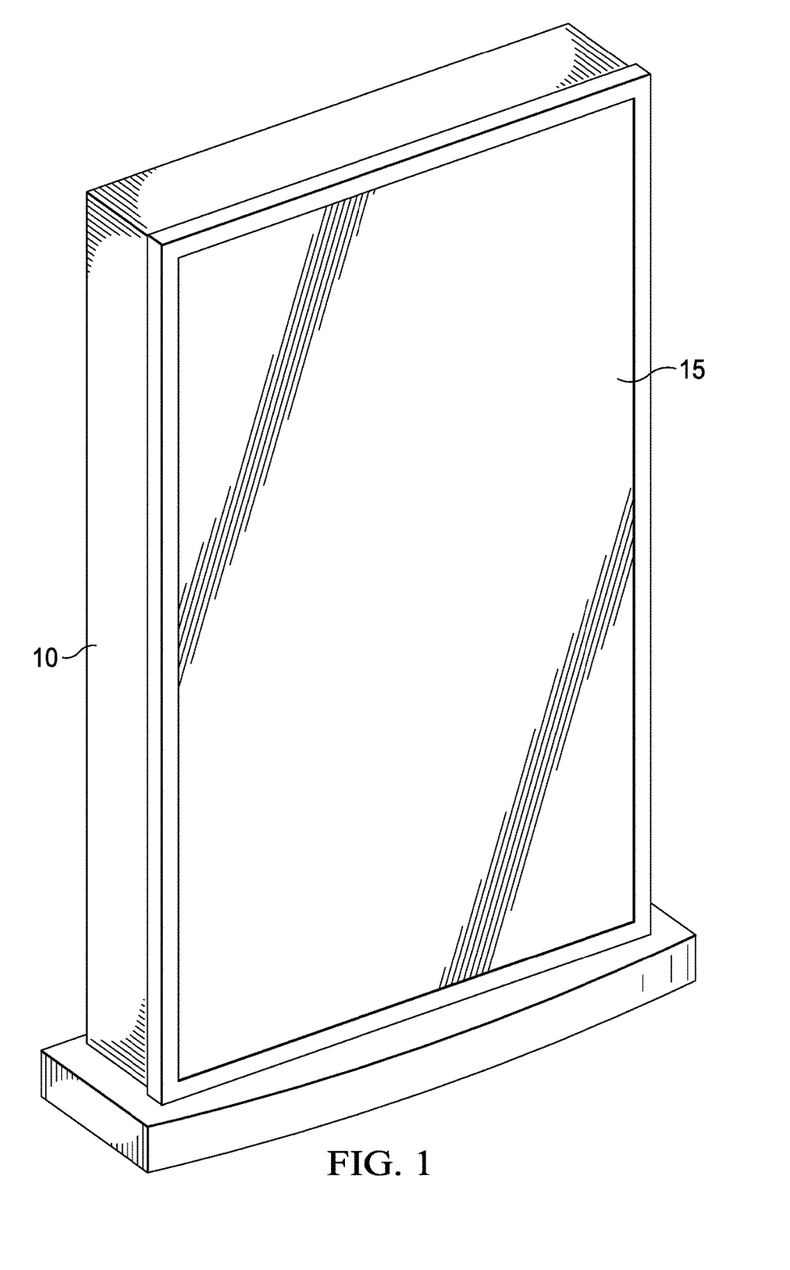
FIG. 1 is a front perspective view of a backlit display.

FIG. 1 is a front perspective view of a backlit display. Here, the backlight and graphic/LCD stack are preferably contained within a housing 10 with a protective transparent sheet 15 placed in front of the graphic/LCD stack. In some embodiments, the protective transparent sheet 15 is glass and may be two sheets of glass laminated together using optical adhesive.

Figure 2:
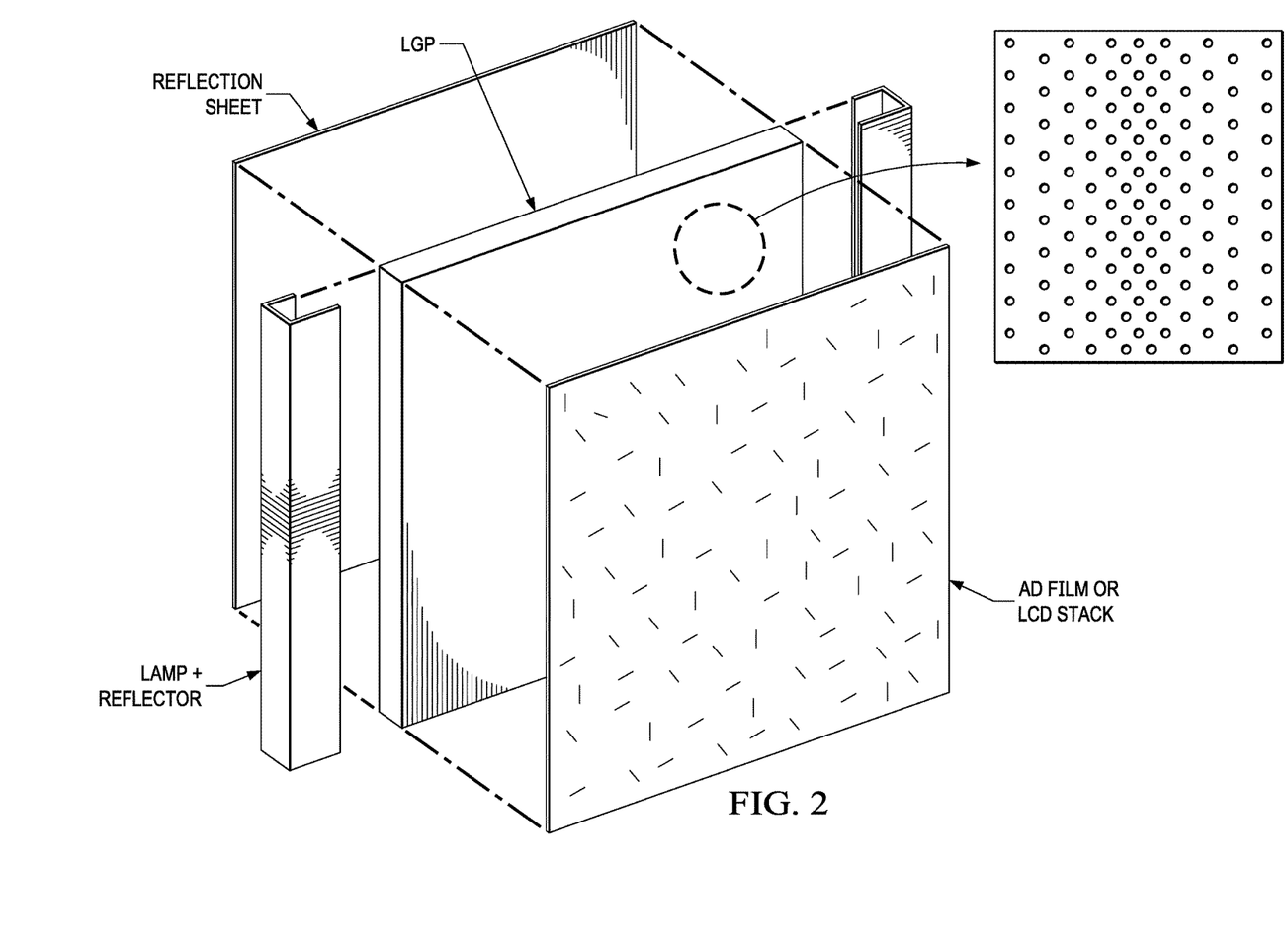
FIG. 2 is an exploded view of an edge-lit backlight assembly.
Figure 3:
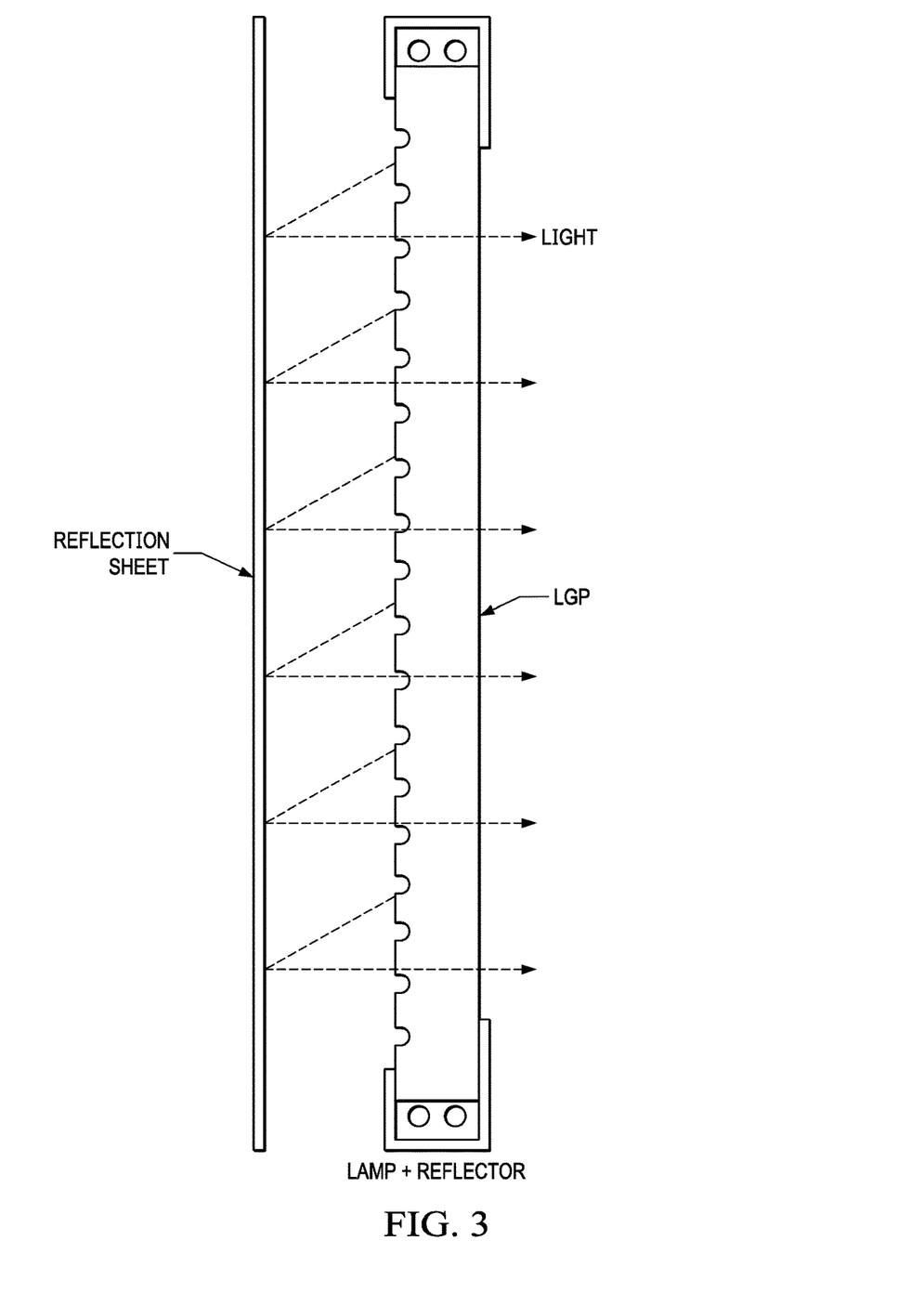
FIG. 3 is a side planar view of the edge-lit backlight assembly shown in FIG. 2 where the advertising poster or LCD stack has been removed.

FIG. 2 is an exploded view of an edge-lit backlight assembly. FIG. 3 is a side planar view of the edge-lit backlight assembly shown in FIG. 2 where the advertising poster or LCD stack has been removed.

Here, a lamp and reflector assembly is positioned along the edge of a light guide plate (LGP) such that the light emitted from the lamp and reflector assembly is directed into the LGP. A reflection sheet is preferably placed behind the LGP so that light rays can go through a series of reflections and refractions until exiting the front surface of the LGP and illuminating the advertising poster or LCD stack. Generally, a pair of lamp and reflector assemblies are positioned on opposing edges of the LGP.

As used herein, the term 'LCD stack' is defined as any LCD assembly capable of generating an image from backlight illumination. The term 'LCD stack' includes any type of LCD design, including but not limited to twisted nematic, in-plane switching, super in-plane switching, TFT dual transistor, fringe field switching and advanced fringe field switching, vertical alignment, advanced super view, and blue phase mode. The various layers and orientation of the layers will vary depending on the particular type of LCD stack and the exemplary embodiments described herein do not require anything specific from the LCD stack other than generating an image.

Figure 4:
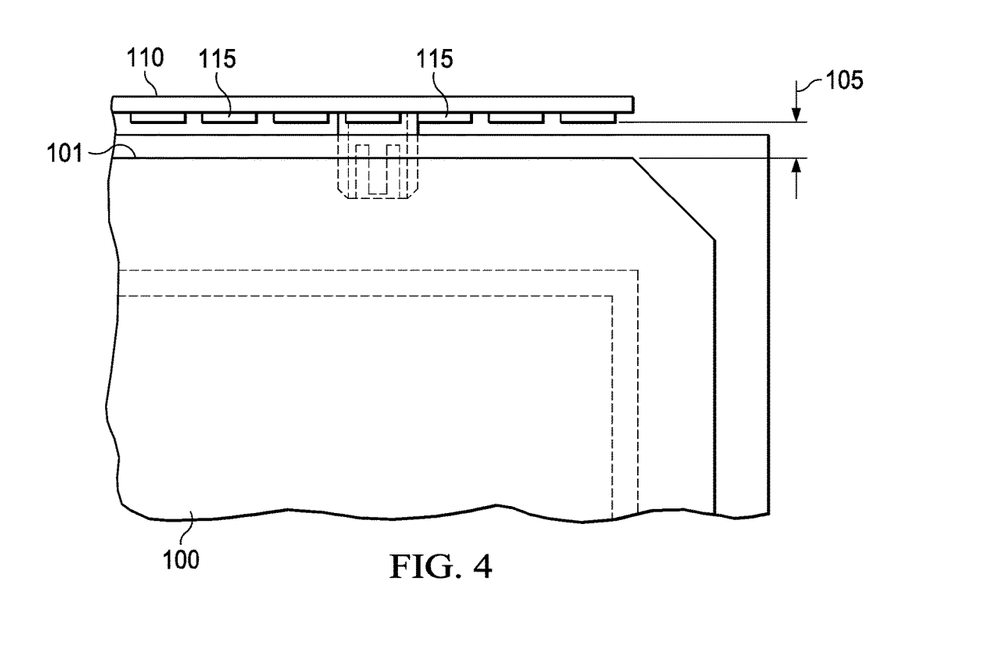
FIG. 4 is a front planar view of the relative positioning of the LEDs in relation to the light guide.

FIG. 4 is a front planar view of the relative positioning of the LEDs 115 in relation to the light guide 100. The LEDs 115 are preferably mounted to a substrate 110 which is typically some type of printed circuit board (PCB), preferably a metal core PCB. The substrate 110 is preferably positioned so as to produce the desired distance (D) 105 between the edge 101 of the light guide 100 and the LEDs 115. The distance (D) 105 may be selected based on the effectiveness and efficiency of the resulting illumination exiting the front surface of the light guide 100. It is desirable to then maintain this distance (D) 105 even though thermal expansion/contraction of the light guide 100 throughout its lifetime.

Figure 5:
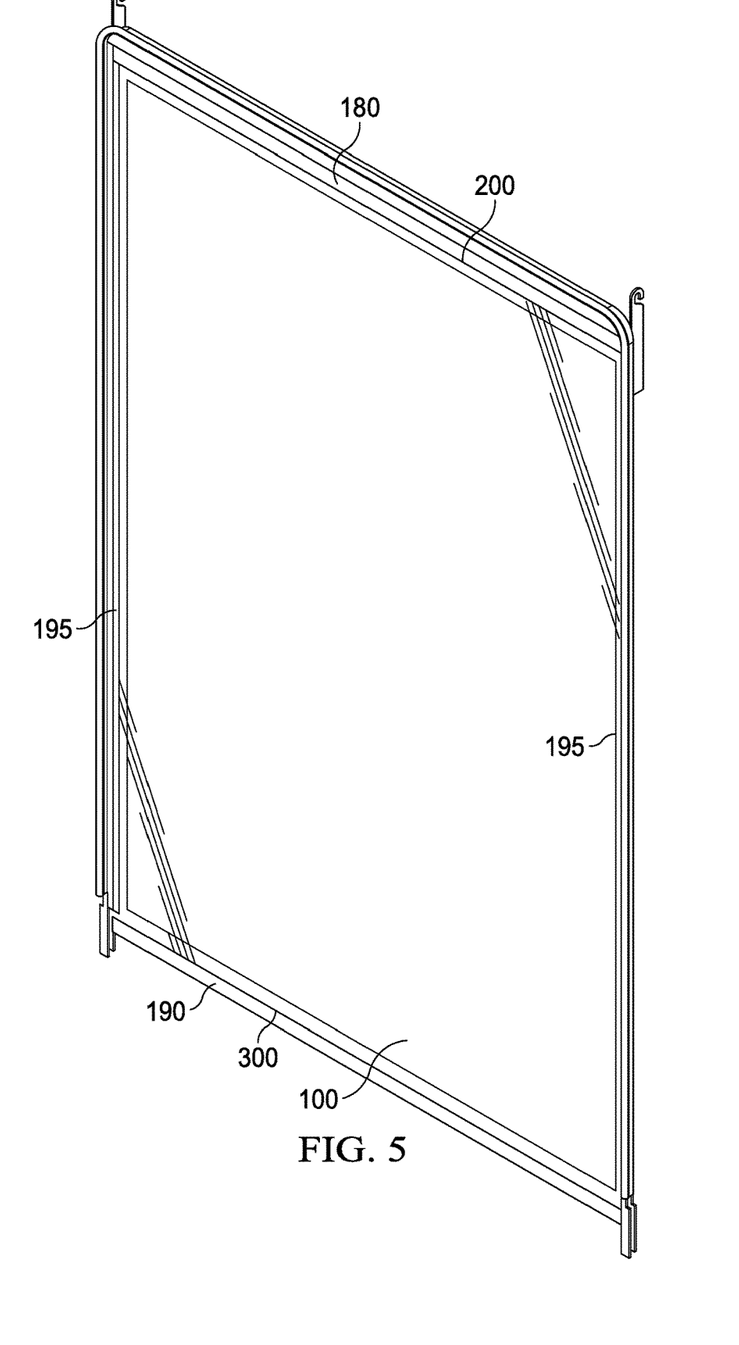
FIG. 5 is a front perspective view of an exemplary backlight assembly where the advertising poster or LCD stack has been removed.

FIG. 5 is a front perspective view of an exemplary backlight assembly where the assembly has been removed from the housing 10 and the front protective transparent plate 15 as well as the advertising poster or LCD stack has been removed. The light guide 100 may be surrounded by a top bezel 180 along the top edge 200, bottom bezel 190 along the bottom edge 300, and side bezels 195 along the sides of the backlight assembly. In this embodiment, the LED assemblies are positioned along the top edge 180 and bottom edge 300, but it should be noted that this is not required. In other embodiments the LED assemblies could be positioned along the opposing side vertical edges of the assembly or only along one edge of the assembly, be it top 200, bottom 300, or sides. It should also be noted, that although shown with a 'portrait' orientation (where the backlight has a longer vertical dimension than the horizontal dimension) this is not required as the backlight could also be square or could be in the 'landscape' orientation (where the backlight has a longer horizontal dimension than the vertical dimension).

Figure 6:
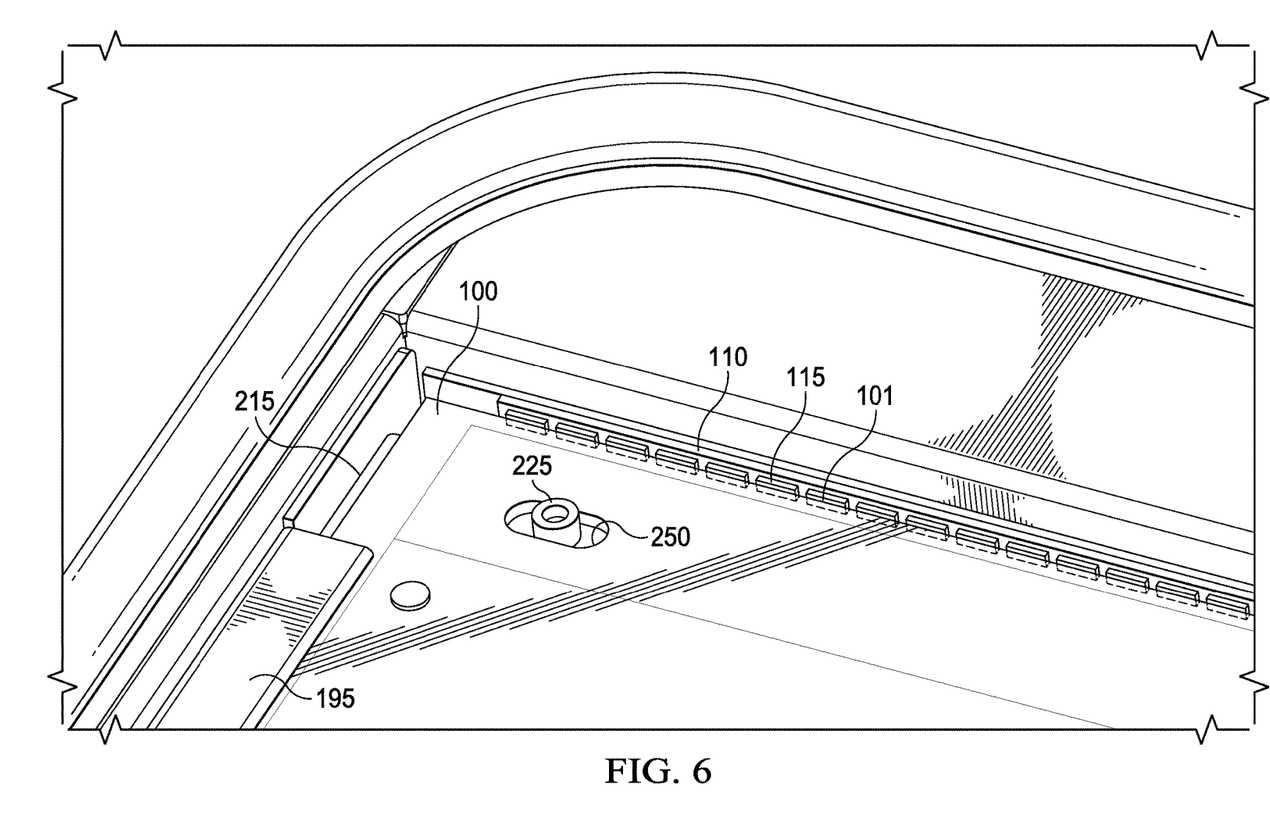
FIG. 6 is a front perspective view of the left top corner of the backlight assembly shown in FIG. 5 where the top bezel has been removed.

FIG. 6 is a front perspective view of the left top corner of the backlight assembly shown in FIG. 5 where the top bezel 180 has been removed. A back pan 215 is preferably fixed within the housing 10 and contains a post 225 which extends forward (towards an intended observer) from the back pan 215 and passes through a slot 250 which is placed within the light guide 100. In this particular embodiment, the distance 105 is provided as the distance between the top edge 101 of the light guide 100 and the LEDs 115. Here, the slot 250 is preferably oriented perpendicular to the distance 105 such that the light guide 100 is fixed within the vertical dimension but is free to move in the horizontal dimension. Some embodiments may use more than one slot 250 in the light guide, with some distributing a plurality of slots across the top edge of the light guide 100.

It should also be noted that some embodiments may utilize clamps rather than the slots shown in the embodiments herein. Thus, a plurality of clamps may be used to hold each LED subassembly at the desired distance from the edge of the light guide, while permitting the light guide itself to move freely within the enclosure. Further, other embodiments may use tabs to hang the light guide vertically while permitting it to expand and contract.

Figure 7:
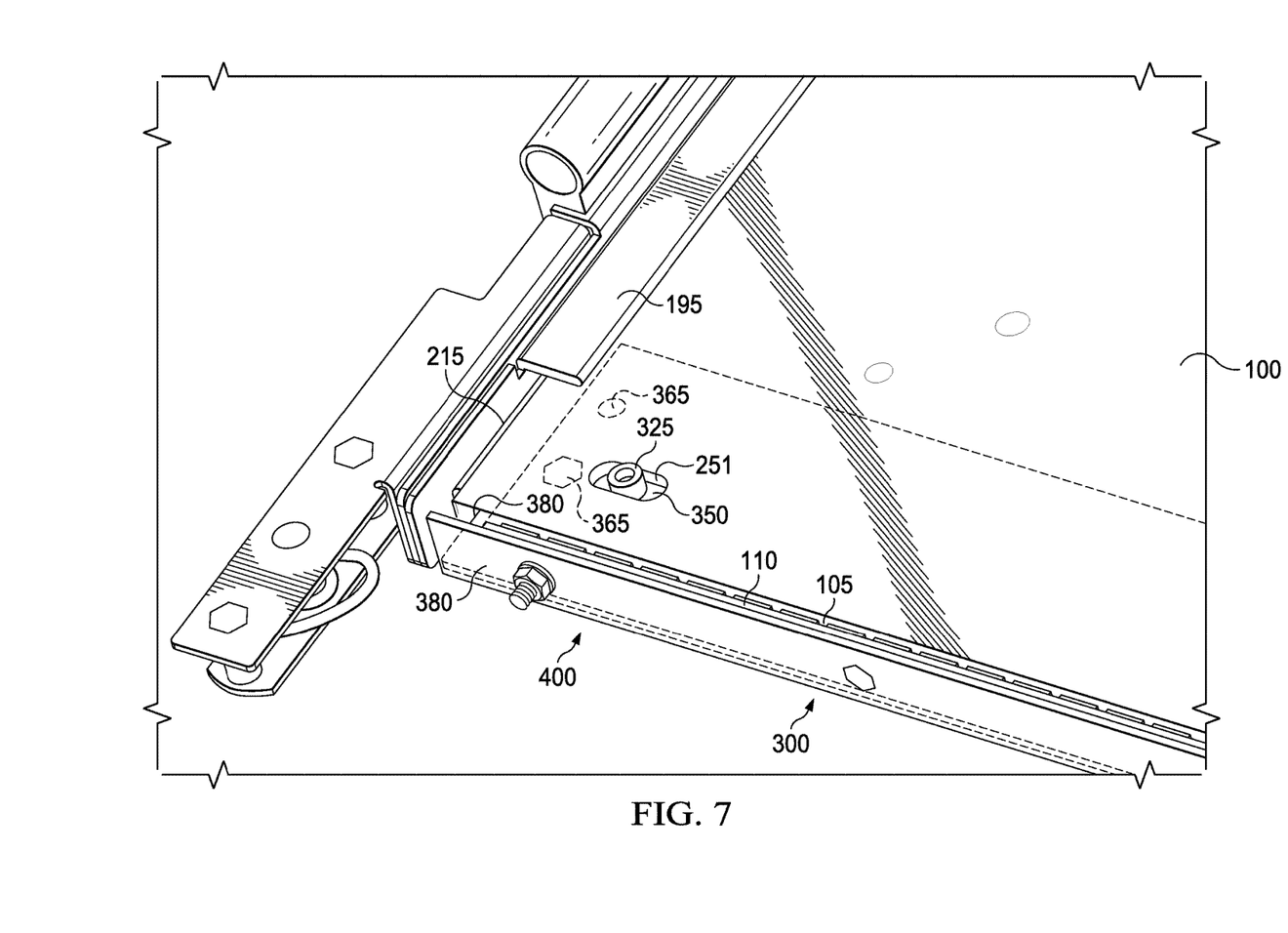
FIG. 7 is a front perspective view of the left bottom corner of the backlight assembly shown in FIG. 5 where the bottom bezel has been removed.

FIG. 7 is a front perspective view of the left bottom corner of the backlight assembly shown in FIG. 5 where the bottom bezel 190 has been removed. Preferably, another slot 251 is placed within the light guide 100, with this slot 251 being placed near the bottom edge of the light guide 100 and is substantially parallel to the slot 250 which is positioned at the top of the light guide 100. A light guide spacer 350 is preferably positioned behind the light guide 100 and contains a post 325 which extends from the light guide spacer 350 forwards (towards an intended observer) and passing through the slot 251. In this way, the light guide 100 can expand/contract in the horizontal dimension without having much effect on the light guide spacer 350. However, when the light guide 100 expands/contracts vertically, through the post 325 it will cause the light guide spacer 350 to move as well.

A connecting assembly 380 is preferably attached to the light guide spacer 350 so that the connecting assembly 380 will move when the light guide spacer 350 moves. The connecting assembly 380 is then preferably connected to another substrate 110 containing a plurality of LEDs 115. In this way, the substrate 110 and LEDs 115 preferably move when the connecting assembly 380 moves. Generally speaking, the light guide spacer 350, connecting assembly 380, substrate 110, and LEDs 115 may be collectively referred to as a sliding LED subassembly, indicated generally as 400. However, it should be noted that other pieces may be included in the sliding LED subassembly 400, and in some embodiments the light guide spacer 350 and connecting assembly 380 may comprise a single piece. In a preferred embodiment, the collective parts of the sliding LED subassembly 400 preferably move together as a unit. As shown and described in this embodiment, the sliding LED subassembly 400 is permitted to move vertically but is constrained from substantially horizontal movement.

A substrate 110 containing a plurality of LEDs 115 is preferably placed adjacent to the bottom edge of the light guide 100 and again is preferably placed to obtain the desired distance 105 from the edge of the light guide 100 to the LEDs 115 on the substrate 110. The slot 251 is again preferably positioned perpendicular to the distance 105. In this embodiment, a pair of posts 365 are used to connect the light guide spacer 350 with the connecting assembly 380, although posts are not required nor is it required that a pair of them are used. Any technique for attaching the light guide spacer 350 to the connecting subassembly 380 would be acceptable (rivets, fasteners, adhesive, welding, etc.) and some embodiments may provide the light guide spacer 350 and connecting assembly 380 as a single unitary piece.

Figure 8:
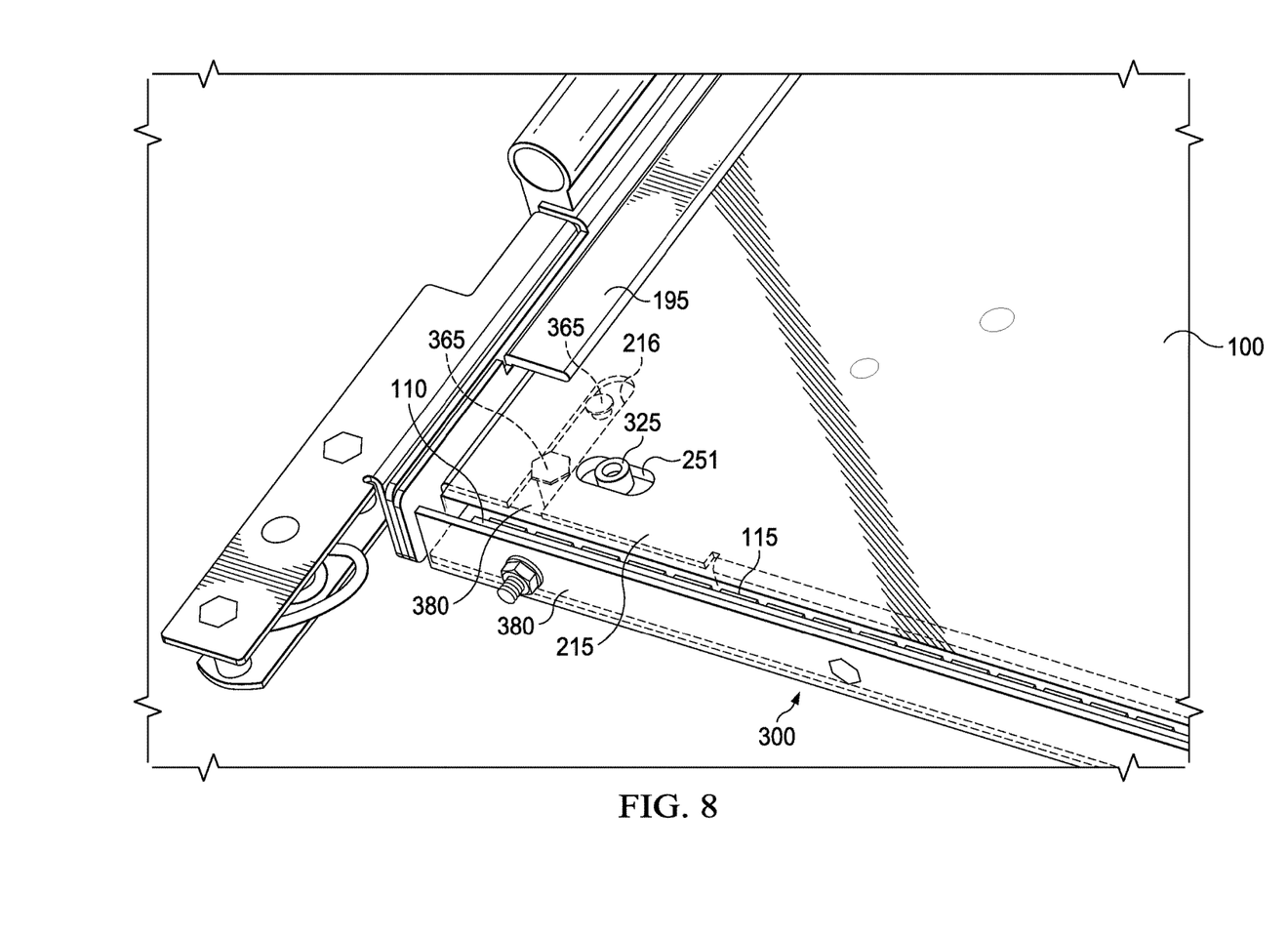
FIG. 8 is the same view as FIG. 7 where the light guide spacer has been removed.

FIG. 8 is the same view as FIG. 7 where the light guide spacer 350 has been removed. The back pan 215 is preferably behind the light guide spacer and may contain a slot 216 to allow the posts 365 (which pass through the slot 216 to connect the light guide spacer 350 with the connecting assembly 380) to slide in a direction perpendicular to the direction of the slot 251 within the light guide 100. Since the substrate 110 containing the LEDs 115 is preferably attached to the connecting assembly 380, the LEDs 115 will move with the connecting assembly 380 which moves with the light guide spacer 350, which moves with the light guide 100 due to the post 325. Therefore, the substrate 110 and LEDs 115 will travel with the light guide 100 as it expands and contracts, thus maintaining the desired distance 105 between the light guide 100 and the LEDs 115.

Figure 9:
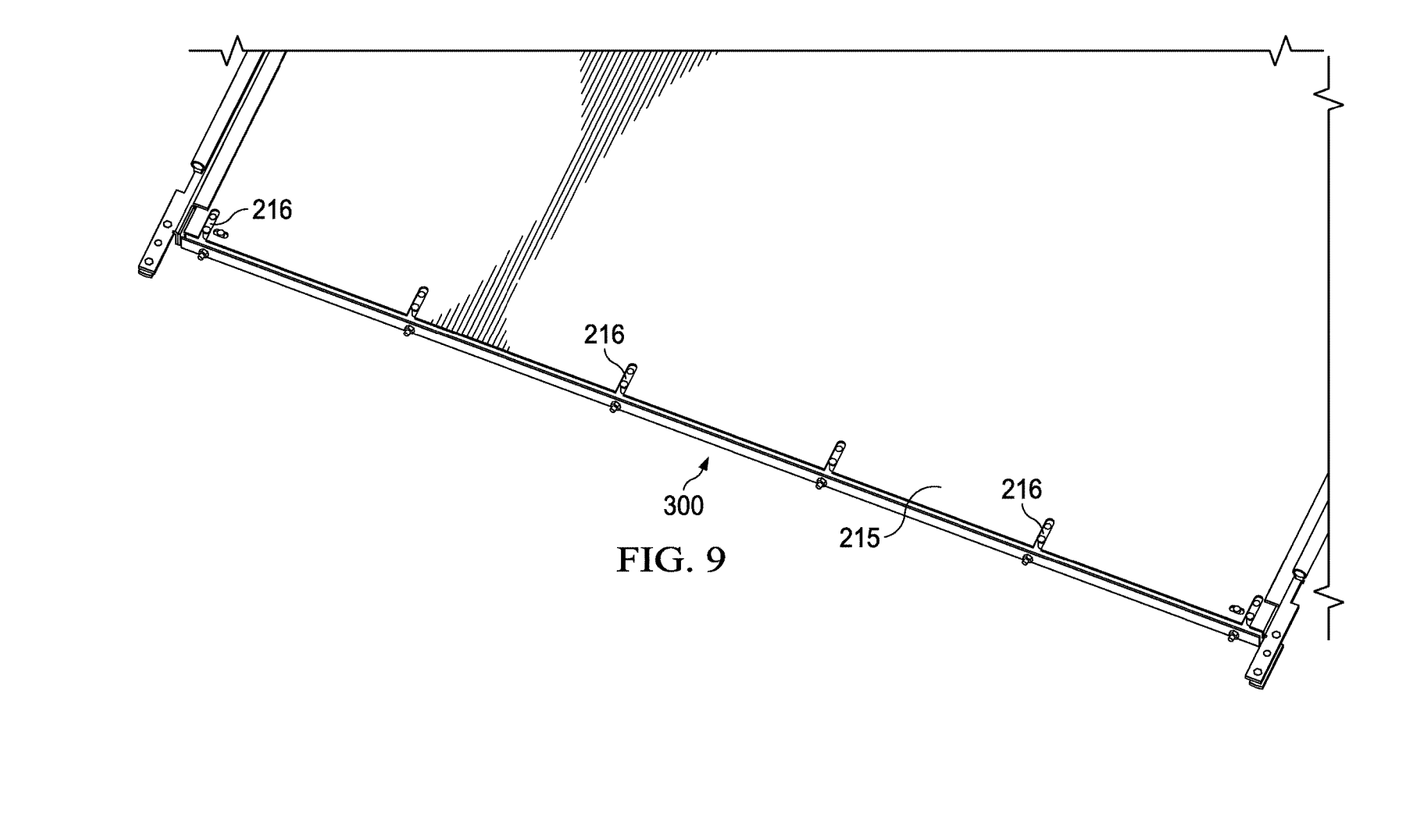
FIG. 9 is a front perspective view of the bottom edge of the backlight assembly shown in FIG. 5 where the bottom bezel and light guide spacer have been removed.

FIG. 9 is a front perspective view of the bottom edge of the backlight assembly shown in FIG. 5 where the bottom bezel 190 and light guide spacer 350 have been removed. Here, a plurality of slots 216 are distributed across the bottom edge 300 of the backlight assembly, or in this embodiment, across the bottom edge of the back pan 215.

Figure 10:
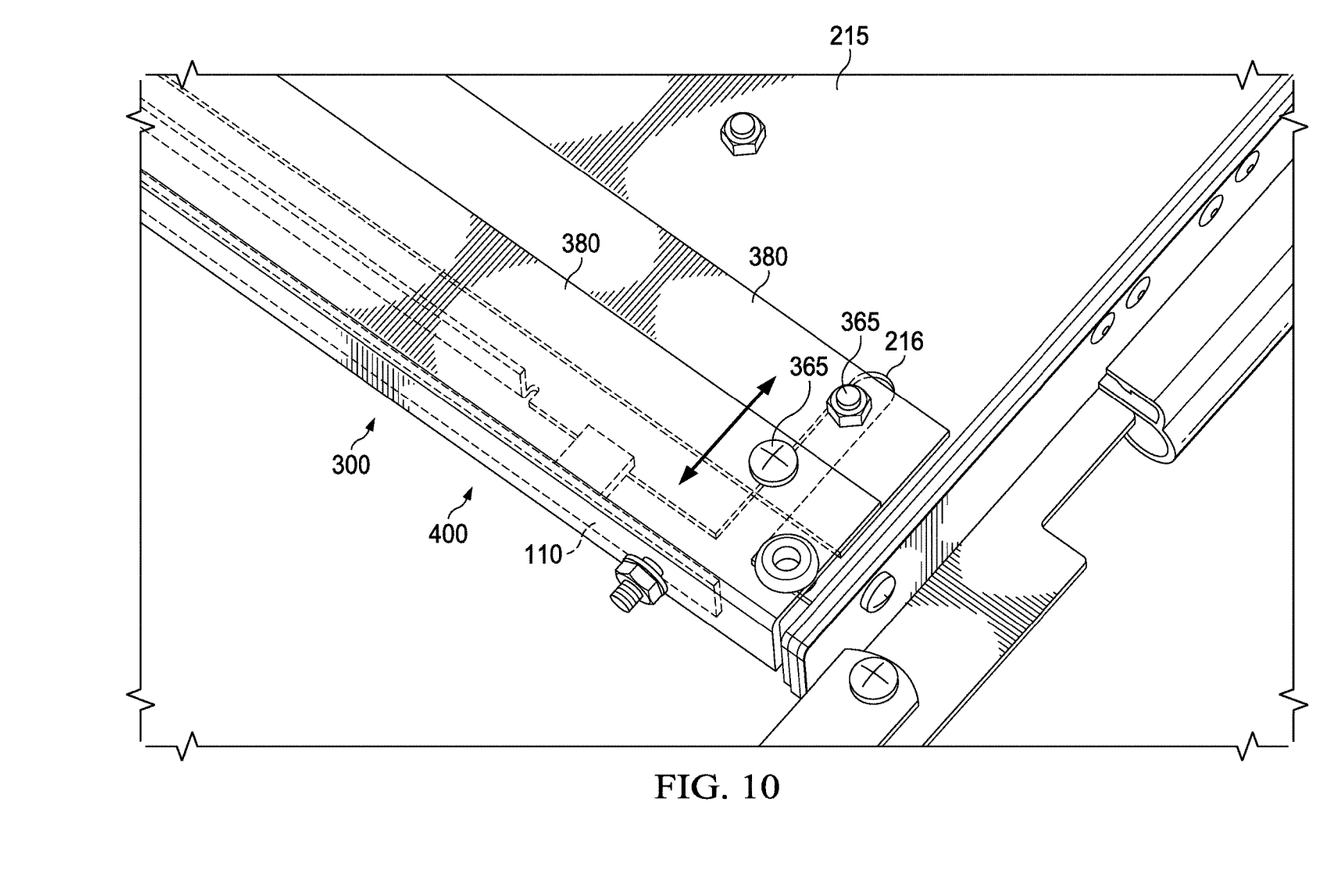
FIG. 10 is a rear perspective view of the left bottom edge of the backlight assembly shown in FIG. 5.

FIG. 10 is a rear perspective view of the left bottom edge of the backlight assembly shown in FIG. 5. The posts 365 are shown connecting the light guide spacer 350 with the connecting assembly 380. As indicated, the sliding LED subassembly 400 (including the substrate 110 and LEDs 115) is permitted to travel back and forth to match the movement of the light guide 100.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

I claim:

1. A backlight assembly comprising:
a light guide plate having a pair of opposing edges;
a light guide spacer located rearward of the light guide plate and coupled to the light guide plate so as to be movable therewith;
a back pan located rearward of the light guide spacer; and
a sliding LED subassembly, the sliding LED subassembly comprising a connecting assembly, and a plurality of LEDs that are separated from the edge of the light guide by a gap of some distance, a portion of the connecting assembly of the LED subassembly located rearward of the back pan and coupled to the light guide spacer by an element that passes through a slot in the back pan such that the LED subassembly is movable with the light guide spacer and the distance between the LEDs and the edge of the light guide plate will remain the same during movement of the light guide plate.

2. The backlight assembly of claim 1 further comprising:
a plurality of LEDs positioned adjacent to the edge of the light guide plate opposite the sliding LED subassembly.

3. The backlight assembly of claim 1 further comprising:
a slot in the light guide plate; and
a post extending from the back pan and aligned within the slot in the light guide plate.

4. The backlight assembly of claim 3 wherein:
the slot is oriented substantially parallel to the opposing edges of the light guide plate.

5. The backlight assembly of claim 1 wherein:
the slot in the back pan permits the sliding LED subassembly and the light guide spacer to move relative to the back pan.

6. The backlight assembly of claim 1 further comprising:
a slot placed in the light guide plate; and
a post extending from the connecting assembly of the sliding LED assembly, the post passing through light guide spacer and aligned within the slot in the light guide plate.

7. The backlight assembly of claim 6 wherein:
the post couples the sliding LED assembly to the light guide plate.

8. A backlight assembly comprising:
a light guide having a first pair of opposing edges and a second pair of opposing edges;
a first slot in the light guide located near and oriented substantially parallel to a first one of the first pair of opposing edges;
a second slot in the light guide located near and oriented substantially parallel to a second one of the first pair of opposing edges;
a third slot in the light guide located along and oriented substantially perpendicular to at least the first one of the first pair of opposing edges;
a back pan located rearward of the light guide and having a slot that is oriented substantially parallel to the third slot in the light guide;
a sliding LED subassembly extending along at least the first one of the first pair of opposing edges of the light guide, the LED subassembly having a coupling element that extends through the slot in the back pan and into the third slot in the light guide, and is slidable within said slots.

9. The backlight assembly of claim 8 wherein:
the sliding LED subassembly comprises a plurality of LEDs that are located at a distance (D) from at least one of the first pair of opposing edges of the light guide; and
the sliding LED subassembly is movable with the light guide such that the distance (D) will remain substantially unchanged during expansion or contraction of the light guide.

10. The backlight assembly of claim 8 wherein:
a post extends forward from the back pan and into the first slot in the light guide, thereby slidably coupling the light guide to the back pan.

11. The backlight assembly of claim 8 wherein:
a multitude of said third slots reside in the light guide along the first one of the first pair of opposing edges;
a multitude of said back pan slots reside in the back pan, the back pan slots aligned with the third slots in the light guide; and
the LED subassembly includes a multitude of coupling elements that extend through the slots in the back pan and into the third slots in the light guide.

12. The backlight assembly of claim 8 wherein:
a multitude of said third slots reside in the light guide along both the first one and second one of the first pair of opposing edges;
a multitude of said back pan slots reside in the back pan, the back pan slots aligned with the third slots located along both the first one and second one of the first pair of opposing edges of the light guide; and
an LED subassembly is located along both the first one and second one of the first pair of opposing edges of the light guide, the LED subassemblies each including a multitude of coupling elements that extend through the slots in the back pan and into the third slots in the light guide.

13. The backlight assembly of claim 8 wherein:
the sliding LED subassembly comprises a light guide spacer positioned between the light guide and the back pan; and a post extends forward from the light guide spacer and into the second slot in the light guide, such that movement of the light guide in a direction parallel to the second slot will have substantially no effect on the light guide spacer, while movement of the light guide in a direction perpendicular to the second slot will result in like movement of the light guide spacer.

14. The backlight assembly of claim 13 wherein:

the sliding LED subassembly further comprises a connecting element that is attached to the light guide spacer as well as to a mounting substrate having a plurality of LEDs affixed thereto;

whereby movement of the light guide spacer will result in like movement of the LED subassembly, thereby maintaining the position of the LEDs relative to the at least first one of the first pair of opposing edges of the light guide.

15. A backlight assembly comprising:

a back pan having first and second opposing edges;

a light guide located forward of the back pan, the light guide having first and second opposing edges that are substantially parallel to the first and second opposing edges of the back pan;

a light guide spacer interposed between the back pan and the light guide;

a sliding LED subassembly located along each of the opposing edges of the light guide, the LED subassembly including a connecting member that resides rearward of the back pan;

a plurality of LEDs affixed to each of the LED subassemblies such that the LEDs are respectively positioned along each of the opposing edges of the light guide at a set distance therefrom;

a plurality of back pan coupling slots located near the first edge of the light guide and oriented substantially parallel thereto;

a plurality of back pan coupling posts extending forward from the back pan and aligned within corresponding back pan coupling slots in the light guide;

a plurality of light guide spacer coupling slots located near the second edge of the light guide and oriented substantially parallel thereto;

a plurality of light guide spacer coupling posts extending forward from the light guide spacer and aligned within corresponding light guide spacer coupling slots in the light guide;

a plurality of clearance slots located near each of the first edge and the second edge of the back pan and oriented substantially perpendicular to the first and second opposing edges thereof;

a plurality of clearance slots located near each of the first edge and the second edge of the light guide and oriented substantially perpendicular to the first and second opposing edges thereof, the clearance slots in the light guide aligned with the clearance slots in the back pan; and a plurality of light guide spacer coupling elements extending forward from the connecting member of the LED subassembly, the light guide spacer coupling posts passing through corresponding clearance slots in the back pan, through the light guide spacer, and aligned within corresponding clearance slots in the light guide, the light guide spacer coupling elements coupling the LED subassembly to the light guide spacer;

wherein expansion or contraction of the light guide in a direction substantially parallel to the first and second opposing edges thereof will not substantially effect the position of the light guide spacer, while expansion or contraction of the light guide in a direction substantially perpendicular to the first and second opposing edges thereof will result in a like movement of the light guide spacer and the LED subassembly coupled thereto, thereby maintaining the set distance of the LEDs from the first and second opposing edges of the light guide.

16. The backlight assembly of claim 15 wherein:

the light guide spacer coupling elements are selected from the group consisting of posts, threaded fasteners, and rivets.

17. The backlight assembly of claim 15 wherein:

wherein some expansion or contraction of the light guide in a direction substantially perpendicular to the first and second opposing edges thereof is possible before resulting in like movement of the light guide spacer.

18. The backlight assembly of claim 15 wherein:

the sliding LED subassembly comprises a plate-like connecting member that abuts a rear surface of the back pan, and a forward extending side wall that is configured to receive and retain the LEDs.

19. The backlight assembly of claim 15 wherein:

the LEDs reside on a substrate that is affixed to the respective LED subassembly side walls.

* * * * *